United States Patent
Hedrich

(10) Patent No.: US 8,839,760 B1
(45) Date of Patent: Sep. 23, 2014

(54) APPARATUS FOR ROTATING A CRANKSHAFT

(71) Applicant: Achim H. Hedrich, Keswick (CA)

(72) Inventor: Achim H. Hedrich, Keswick (CA)

(73) Assignee: Achim H. Hedrich, Keswick, Ontario (CA)

( * ) Notice: Subject to any disclaimer, the term of this patent is extended or adjusted under 35 U.S.C. 154(b) by 31 days.

(21) Appl. No.: 13/847,563

(22) Filed: Mar. 20, 2013

(51) Int. Cl.
F02D 17/02 (2006.01)
F02B 75/18 (2006.01)
F02B 75/22 (2006.01)
F16C 3/06 (2006.01)

(52) U.S. Cl.
CPC .. *F02D 17/02* (2013.01); *F16C 3/06* (2013.01)
USPC .......... 123/198 F; 123/197.5; 123/53.3; 123/53.6; 123/55.2; 123/55.5; 123/55.7

(58) Field of Classification Search
USPC ....... 123/198 F, 197.5, 53.3, 53.6, 55.2, 55.5, 123/55.7
See application file for complete search history.

(56) References Cited

U.S. PATENT DOCUMENTS

| | | | |
|---|---|---|---|
| 785,713 A | 3/1905 | Clark | |
| 897,904 A | 9/1908 | Kent | |
| 1,744,105 A | 8/1930 | Neldner | |
| 3,195,420 A | 7/1965 | Johannsen | |
| 3,400,702 A | 9/1968 | Watkins | |
| 3,868,932 A | 3/1975 | Toth | |
| 3,946,706 A | 3/1976 | Pailler | |
| 4,013,048 A | 3/1977 | Reitz | |
| 4,462,345 A | 7/1984 | Routery | |
| 4,485,768 A | 12/1984 | Heniges | |
| 4,907,548 A | 3/1990 | Lee | |
| 7,481,195 B2 | 1/2009 | Nelson | |
| 2012/0286521 A1 | 11/2012 | Mayor | |
| 2013/0019836 A1* | 1/2013 | Wilkins | 123/197.3 |

* cited by examiner

*Primary Examiner* — Lindsay Low
*Assistant Examiner* — Tea Holbrook
(74) *Attorney, Agent, or Firm* — Rowand LLP

(57) ABSTRACT

An apparatus for rotating a crankshaft is described. The crankshaft includes a main shaft and an axially offset crank pin connected to the main shaft. The apparatus includes a first piston that alternately drives an attached connecting frame in reciprocating motion. A hub is rotatably mounted within the connecting frame with the hub defining a channel and the crank pin disposed therein. The apparatus includes a locking mechanism with a locked state in which the hub is prevented from rotating and an unlocked state in which the hub freely rotates. The reciprocating motion of the first piston and the connecting frame imparts reciprocating travel of the crank pin between ends of the channel and consequent rotation of the main shaft in the locked state; while the crankshaft and the hub rotate freely in the unlocked state, with the first piston and the connecting frame in a stationary position.

10 Claims, 9 Drawing Sheets

APPARATUS FOR ROTATING A CRANKSHAFT

FIELD

The present application relates to an apparatus for rotating a crankshaft for use in an internal combustion engine.

BACKGROUND

The conventional internal combustion engine includes a number of cylinders. The cylinders are the central working parts of the engine, and each cylinder includes a chamber in which a piston linearly reciprocates by the combustion of gas within the chamber. The linear reciprocation of the pistons turns a crankshaft via a connecting frame (such as, a connecting rod).

The number of cylinders included in an engine may vary depending upon requirements. Typically, the higher the number cylinders included in an engine, the more powerful the engine. However, engines with a higher number of cylinders often consume more fuel than engines with a lower number of cylinders. It may not always be necessary to utilize all of the cylinders during the operation of the engine, such as during light to negative loads. Accordingly, it would be advantageous to be able to cause some or all of the pistons within the cylinders to reciprocate or remain in a stationary position according to demand. This would result in substantial reduction of fuel required by the engine.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

In accordance with the present application, there is provided an apparatus for rotating a crankshaft. The crankshaft includes a main shaft and an axially offset crank pin with each end of the crank pin connected to the main shaft by a respective crank arm. The apparatus includes a first piston. A connecting frame is attached to the first piston, and the first piston is configured to alternately drive the connecting frame in reciprocating motion. A hub is rotatably mounted within the connecting frame with the hub defining a channel therein, and the crank pin is disposed within the channel. The apparatus also includes a locking mechanism that has a locked state in which the hub is prevented by the locking mechanism from rotating within the connecting frame and has an unlocked state in which the hub may freely rotate within the connecting frame. The reciprocating motion of the first piston and the connecting frame imparts reciprocating travel of the crank pin between a first end of the channel to a second end of the channel and consequent rotation of the main shaft when the locking mechanism is in the locked state; while the crankshaft and the hub rotate freely when the locking mechanism is in the unlocked state, and the first piston and the connecting frame are in a stationary position when the locking mechanism is in the unlocked state.

In at least some example embodiments, the apparatus may include two pistons instead of one piston. In such cases, the apparatus further includes a second piston attached to the connecting frame and opposing the first piston. That is, the connecting frame is in between the first piston and the second piston. Similarly, the first piston and the second piston are configured to alternatively drive the connecting frame in reciprocating motion. When the locking mechanism is in the locked state, the reciprocating motion of the first piston and the second piston and the connecting frame imparts reciprocating travel of the crank pin between the first end of the channel and the second end of the channel and consequent rotation of the main shaft. While, when the locking mechanism is in the unlocked state, the second piston together with the first piston and the connecting frame remains in the stationary position. Greater details of such embodiments of the apparatus with two opposing pistons are provided below.

Figure 1:
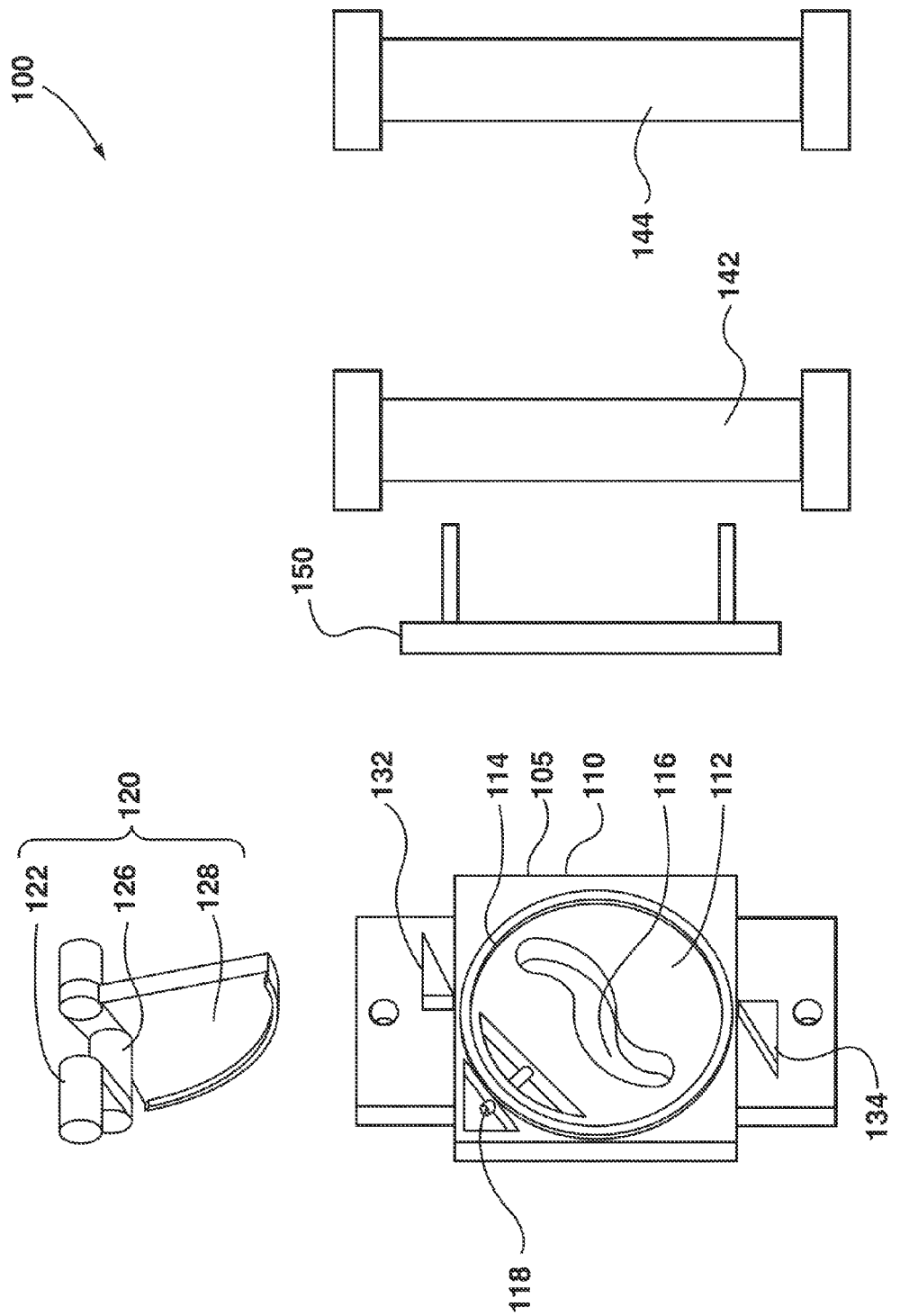
FIG. 1 shows a perspective view of an apparatus for rotating a crankshaft.

Reference is first made to FIG. 1, which shows a perspective view of an apparatus 100 for rotating a crankshaft 120. The apparatus 100 includes a first piston and a second piston (which are not shown). The pistons are adjoined to a connecting frame 105 with the connecting frame 105 located in between the first piston and the second piston. For example, each piston may be attached at an opposite end of the connecting frame 105. The pistons are reciprocating components in that they are configured to alternately drive the connecting frame 105 in reciprocating motion. That is, the pistons may linearly move in one direction and then linearly move in another direction to reciprocate the connecting frame 105.

In at least some example embodiments, each of the pistons may be contained by a cylinder (also not shown) and are made gas-tight by piston rings. The cylinder may include a combustion chamber which is a space at the top of the cylinder, and the pressure of the expanding combustion gases within the combustion chamber is used to drive the pistons. That is, force from the combusted expanding gas is used to reciprocate a piston, and in turn the connecting frame 105. The combustion chambers for each cylinder may operate alternately, in that if gas is being expanded in one combustion chamber, gas is being compressed in the other chamber, so as to provide an alternating force to each piston and allow the connecting frame 105 to reciprocate.

It will be appreciated that the size of the cylinders may vary and may define the length of reciprocation of a piston. More particularly, the length of reciprocation of a piston may be defined as the length between the top dead center (TDC) and the bottom dead center (BDC), with the TDC being at one end of the cylinder while the BDC being at the other end of the cylinder. The TDC is the position of a piston in which it is farthest from the crankshaft (i.e. at the compression stage of the gas immediately before combustion and expansion of the gas), while the BDC is the position of the piston in which it is nearest to the crankshaft (i.e. at the expansion stage of the combusted gases immediately before the start of the compression stage). The dead center (i.e. at TDC or BDC) is also the position in which the linear force applied to the crankshaft is straight along its axis (i.e. no rotational force can be applied to the crankshaft).

The above embodiment describes the apparatus operating within a two-cycle internal combustion engine. It will be appreciated that the apparatus may be applied to any type of internal combustion engine including, for example, a four-cycle internal combustion engine.

In the illustrated example, the connecting frame 105 is depicted as a connecting rod 110, however, it will be appreciated that the connecting frame 105 may be of other types and is not limited to any particular size or shape. The connecting rod 110 connects the pistons to a crankshaft 120 which imparts the reciprocating motion into rotational motion. More particularly, a hub is rotatably mounted within the connecting rod 110. The hub is illustrated as a circular hub 112, however, it will be appreciated that the hub may be of other shapes and designs. In the illustrated example, the connecting rod 110 includes a bearing 114 in which the circular hub 112 is contained to allow for the free rotation of the circular hub around a fixed axis. The circular hub 112 defines a channel 116 therein with a portion of the crankshaft 120 disposed within the channel 116.

The channel 116 defines a space between a first end and a second end. In the illustrated example, the channel 116 defines an s-shape formed in between the first end and the second end. That is, a space shaped by the letter "S" is defined between the first end and the second end of the channel 116. It will be appreciated that the shape of the channel 116 may take other forms, for example, the channel 116 may instead be linear-shaped formed in between the first end and the second end. As will be described below, the channel may be of any shape that will allow the pistons to be stationary at midway between TDC and BDC when the locking mechanism is in the unlocked state.

The crankshaft 120 includes a main shaft 122 and one or more crank pins 126 whose axis are offset from the main shaft 122. Each end of a crank pin 126 is connected to the main shaft 122 by a respective crank arm that extends radially outward from the main shaft 122. The crank pin 126 is the component that converts the linear motion of the pistons and connecting rod 110 into rotational motion to turn the crankshaft 120. More specifically, the crank pin 126 is disposed within the channel 116 of the circular hub 112, and as will be illustrated below, the crank pin 126 converts the linear motion to rotational motion to rotate the crankshaft 120 when moving within the channel 116.

The apparatus 100 further includes a locking mechanism which may, in at least some example embodiments, be in the form of a locking pin 118. The locking pin 118 is adjustable between a locked position and an unlocked position. When the locking pin 118 is in the locked position, it is engaged with the circular hub 112 to prevent the circular hub 112 from rotating within the connecting rod 110 (for example, within the bearing 114 of the connecting rod 110). Also, in such cases, the pistons are operating and provide reciprocating motion. That is, the circular hub 112 is in a locked position while the pistons reciprocate. In contrast, when the locking pin 118 is in the unlocked position, it is disengaged from the circular hub 112, and the circular hub 112 is free to rotate within the connecting rod 110 (for example, within the bearing 114 of the connecting rod 110). Also, in such cases, the pistons are no longer operating and do not provide reciprocating motion. That is, the circular hub 112 rotates while the pistons (and the connecting rod 110) remain in a stationary position. It will be appreciated that the locking mechanism may be of other types instead of a locking pin 118. The locking mechanism may be any type of mechanism that can be changed between a locked state and an unlocked state to respectively engage and prevent the circular hub 112 from rotating, or disengage and allow free rotation of the circular hub 112.

Additionally, as the crank pin 126 is disposed within the channel 116 of the circular hub 112, the change of the state of the circular hub 112 between a locked position and an unlocked position, impacts the force applied on the crank pin 126 by the pistons and the connecting frame. For example, when the locking pin 118 is in the locked position and accordingly, the circular hub 112 is locked (i.e. it cannot rotate), the reciprocating motion of the first piston and the second piston and the connecting rod 110 imparts reciprocating travel of the crank pin 126 between a first end of the channel 116 to a second end of the channel 116. That is, the crank pin 126 moves within the space defined by the ends of the channel 116. The movement of the crank pin 126 in turn rotates the main shaft 122 (and consequently, the crankshaft 120).

In such cases when the locking pin 118 is in the locked position, the pistons may reciprocate to define a cycle. A cycle may be referred to as a back and forth reciprocation of the pistons. For example, as mentioned above, each of the pistons may reciprocate between its TDC and BDC, and a cycle may be defined as a reciprocation of a piston, for example, starting at its TDC to BDC, and then back from its BDC to TDC. As the pistons are opposing each other and alternately reciprocating, it will be appreciated that when the first piston is at its TDC, the second piston is at its BDC, while when the first piston is at its BDC, the second piston is at its TDC. The reciprocation of the pistons of a cycle may in turn cause the crank pin 126 to travel back and forth along the length of the channel. The back and forth movement of the crank pin 126 within the channel 116 rotates the main shaft 122.

In contrast, when the locking pin 118 is in the unlocked position and accordingly, the circular hub 112 is unlocked (i.e. it is free to rotate), the crankshaft 120 and the circular hub 112 rotate freely. The free rotation of the crankshaft 120 and the circular hub 112 may occur in a variety of different ways. For example, the free rotation may be caused by the transformation of reciprocating motion from other connecting rods with pistons attached to the crankshaft 120, by an electrical motor, etc. In contrast, the first piston and the second piston and the connecting rod 110 are no longer moving and are in a stationary position. In such cases, each of the pistons may be positioned at or approximately midway between its TDC and BDC. The main shaft 122 is aligned centered at the circular hub 112 and the crank pin 126 rotates about the main shaft 122 with the channel 116. That is, the main shaft 122 is positioned aligned at the center of the circular hub 112 (which is also in alignment with the center of the channel 116), and the rotation of the main shaft 122 rotates the crank pin 126 around the main shaft 122 along with the channel 116. The rotation of the crank pin 126 rotates the circular hub 112 as the channel 116 is being rotated.

In at least some example embodiments, the crankshaft 120 may further include an arc-shaped extension 128 that includes at least a portion that extends beyond the crank arms. That is, the length of the arc-shaped extension 128 from the main shaft 122 is greater than the length of extension of the crank arms (at which length the crank pins 126 are attached to the crank arms) from the main shaft 122. The arc-shaped extension 128 includes a first side, a second side and an arc. The first side is in alignment with a crank arm, and at an angle offset from the second side that defines the angle of the arc. That is, the first side extends from the main shaft in alignment with the crank arm (in at least some example embodiments, the first side may, instead be in near-alignment with the crank arm (i.e. the first side extends slightly offset from the crank arm)) and the second side extends from the main shaft at an angle from the first side (accordingly, the portion of the arc-shaped extension that extends beyond the crank arms includes a portion of the first side, a portion of the second side and the arc). The angle of separation between the first side and the second side defines the angle of the arc. In at least some example embodiments, the angle that the first side is offset from the second side is ninety degrees. That is, the angle of separation between the two sides is ninety degrees which is the angle of the arc. It will be appreciated that, in at least some example embodiments, the angle between the first side and the second side may be different.

In at least some example embodiments, the connecting rod 110 may further include a first protrusion 132 that is located between the first piston and the circular hub 112, and a second protrusion 134 that is located between the second piston and the circular hub 112. The protruded portions alternately engage the arc of the arc-shaped extension 128 during reciprocation of the pistons and rotation of the crankshaft 120 when the locking pin 118 is in the locked position. As the extension 128 is arc-shaped, the arc engages the protrusions at certain points of travel of the crank pin 126 within the channel 116. More particularly, the first protrusion 132 engages the arc when the first piston is positioned at its TDC from the main shaft 122 and the second piston is positioned at its BDC from the main shaft 122. At such a position, the connecting rod 110 is stationary and the crank pin 126 is at an end of the channel 116 (such as, the first end). After the first piston reaches its TDC, a force is applied on the first piston to move in the opposite direction (for example, the combustion of gases above the first piston exerts an opposing force on the first piston to now travel downwards after having traveled upwards). As the crank pin 126 is at the end of the channel 116, the first piston may exert this opposing force on to the crank pin 126 which may hinder the movement of the crank pin 126 within the channel 116.

Accordingly, the arc of the arc-shaped extension 128 engages the first protrusion 132 to impart the first opposing force from the first piston against the crank pin 126 via the connecting rod 110 to the main shaft 122 to allow the free travel of the crank pin 126 within the channel 116. That is, the engagement between the arc and the first protrusion 132 passes the opposing force from the first piston directly to the main shaft 122 instead of the crank pin 126. As such, when the crank pin 126 reaches the end of the channel 116 (such as, the first end) and the first piston is at its TDC, the crank pin 126 may be allowed to travel freely in the opposite direction along the channel 116, while the pistons and the connecting rod 110 remain in a stationary position due to the engagement of the arc and the first protrusion 132. The engagement is maintained until the movement of the crank pin 126 rotates the arc-shaped extension 128 and the arc clears the first protrusion 132. That is, the arc and the first protrusion 132 are no longer engaged (i.e. they are disengaged). After disengagement of the arc and the first protrusion 132, the pistons and the connecting rod 110 may linearly move again (i.e. they may reciprocate), and are no longer stationary. The pistons and the connecting rod 110 move in the direction of the opposing force exerted by the first piston (which in this case is in the downward direction).

Similarly, the second protrusion 134 engages the arc when the second piston is positioned at its TDC from the main shaft 122 and the first piston is positioned at its BDC from the main shaft. Again, at such a position, the connecting rod 110 is stationary and the crank pin 126 is at the other end of the channel (such as, the second end). Similarly, after the second piston reaches its TDC, a force is applied on the second piston to move in the opposite direction (for example, the combustion of gases below the second piston exerts an opposing force on the second piston to now travel upwards after having traveled downwards). As the crank pin 126 is at the end of the channel 116, the second piston may exert this opposing force (which is in this case is an upward force after the second piston has moved in a downward direction) on to the crank pin 126. The exertion of such a force may hinder the movement of the crank pin 126 within the channel 116.

Similarly, the arc of the arc-shaped extension 128 engages the second protrusion 134 to impart the second opposing force from the second piston against the crank pin 126 via the connecting rod 110 to the main shaft 122 to allow the free travel of the crank pin 126 within the channel 116. That is, the engagement between the arc and the second protrusion 134 passes the opposing force from the second piston directly to the main shaft 122 instead of the crank pin 126. As such, when the crank pin 126 reaches the end of the channel 116 (such as, the second end) and the second piston is at its TDC, the crank pin 126 may be allowed to travel freely in the opposite direction along the channel 116, while the pistons and the connecting rod 110 remain in a stationary position due to the engagement of the arc and the second protrusion 134. The engagement is maintained until the movement of the crank pin 126 rotates the arc-shaped extension 128 and the arc clears the second protrusion 134. That is, the arc and the second protrusion 134 are no longer engaged (i.e. they are disengaged). After disengagement of the arc and the second protrusion 134, the pistons and the connecting rod 110 may linearly move again (i.e. they may reciprocate), and are no longer stationary. The pistons and the connecting rod 110 move in the direction of the opposing force exerted by the second piston (which in this case is in the upward direction).

Additionally, in at least some example embodiments, the protrusions are ramp-shaped. In such example embodiments, the arc-shaped extension 128 when engaging the ramp-shaped protrusion may act as a lever to provide an additional force in assisting the movement of the crank pin 126 within the channel 116 (and consequent rotation of the main shaft 122).

It will be appreciated that in at least some example embodiments, the arc-shaped extension 128 may be an extension of other shapes and configurations; as long as the extension engages the protrusions during different points of travel of the crank pin 126 within the channel 116 to impart opposing forces from the pistons against the crank pin 126 to the main shaft 122 to allow the free travel of the crank pin 126 within the channel 116.

As mentioned above, in at least some example embodiments, when the locking pin 118 is in the unlocked position, each of the pistons may be positioned approximately midway between its TDC and BDC, and the circular hub 112 freely rotates within the connecting rod 110. The main shaft 122 may be aligned centered at the circular hub 112 and the crank pin 126 rotates about the main shaft 122 with the rotating channel 116. In such cases, the arc-shaped extension 128 also rotates around the main shaft 122 with the crank pin 126. In order to allow for the free rotation of the arc-shaped extension 128, the arc-shaped extension 128 does not engage the protrusions. That is, the arc of the arc-shaped extension 128 does not engage the protrusions during rotation of the arc-shaped extension 128. Accordingly, in such example embodiments, the arc-shaped extension 128 may be elevated from the protrusions (as otherwise, in such a position of the main shaft 122 being aligned centered at the circular hub 112, the arc-shaped extension 128 will engage the protrusions as it extends beyond the protrusions). That is, the arc-shaped extension 128 may be aligned at a higher level than the protrusions. The arc may include a depressed portion which allows the arc to engage with the protrusions during reciprocation of the pistons and the connecting rod 110 when the locking pin 118 is in the locked position; because at such a position of the crank pin 126 at or near the ends of the channel 116, the arc-shaped extension 128 does not extend beyond the engaging protrusion (For example, when the first piston is at its TDC and the second piston is at its BDC, and the crank pin 126 is at the first end of the channel 116, the arc-shaped extension 128 does not extend beyond the engaging first protrusion but may extend beyond the non-engaging second protrusion). In contrast, the arc including the depressed portion may be disengaged from the protrusions during non-reciprocation (i.e. stationary state) of the pistons and the connecting rod 110 when the locking pin 118 is in the unlocked position; because as the arc-shaped extension 128 is elevated from the protrusions and at least a portion of the arc-shaped extension 128 extends beyond the protrusions (i.e. the arc including the depressed portion extends beyond the protrusions), the arc including the depressed portion clears the protrusions during rotation of the arc-shaped extension 128.

Additionally, in at least some example embodiments, the arc-shaped extension 128 that includes an arc with a depressed portion may be of other types of configurations; as long as the arc-shaped extension 128 engages the protrusions when the circular hub 112 is locked, and does not engage the protrusions when the circular hub 112 is freely rotating.

In at least some example embodiments, the apparatus 100 may further include a guiding mechanism to support the reciprocating motion of the connecting rod 110. The guiding mechanism may stabilize and align the linear movement of the connecting rod 110 during reciprocation. In at least some example embodiments as illustrated, the guiding mechanism may include a first guide 142 and a second guide 144 that is aligned with the first guide 142. The connecting rod 110 is disposed in between the guides that support the reciprocation of the connecting rod 110. In at least some example embodiments, the length of the guides (i.e. from the one ends of the guides to the other ends of the guides) may define the length of travel of the connecting rod 110 during reciprocation. For example, when the first piston is at its TDC (and the second piston is at its BDC), the connecting rod 110 is at one ends of the guides (i.e. the ends nearest to the first piston), and may linearly move along the length of the guides (due to the reciprocation of the pistons) until the connecting rod 110 reaches the other ends of the guides (i.e. the ends nearest to the second piston) at which position the second piston is at its TDC (and the first piston is at its BDC). Accordingly, the connecting rod travels back and forth from one ends of the guides to the other ends of the guides during reciprocation.

In at least some example embodiments, the apparatus 100 may further include a locking mechanism that engages the connecting rod 110 to maintain the connecting rod 110 at the fixed position when the locking pin 118 is in the unlocked position. That is, the locking mechanism engages the connecting rod 110 to stabilize the connecting rod 110 at a stationary position when the locking pin 118 is in the unlocked position. The locking mechanism is disengaged from the connecting rod 110 to allow the reciprocation of the connecting rod 110 when the locking pin 118 is in the locked position.

In the illustrated example, the locking mechanism is a connecting rod lock 150 that includes at least a first projection and a second projection. Each of the projections cooperates with an opening within a guide (such as, the first guide 142 or the second guide 144). The openings define a passage way through each of the guides. As such, the projections insert within the openings and at least a portion of the projections extend beyond the openings to engage the connecting rod 110. That is, each of the projections passes through the openings from one side of the guide to the other side of guide such that a portion of each of the projections extends beyond the openings. Accordingly, when the locking pin 118 is in the unlocked position, at least a portion of each of the projections pass through the openings to engage the connecting rod 110 and maintain the connecting rod 110 at the fixed position. For example, the bearing 114 of the connecting rod 110 that includes the circular hub 112 may be in between each of the portions of the projections extending beyond the openings, and may be engaged by these portions to stabilize the connecting rod 110 at a stationary position. That is, the bearing 114 may be held and prevented by the portions of the projections extending beyond the openings from moving.

It will be appreciated that other forms of locking mechanisms may be implemented that may or may not be in the form of cooperating grooves/slots and projections.

Reference will now be made to FIGS. 2 to 9 which show various example embodiments of the apparatus 100 for rotating the crankshaft 120. More specifically, the example embodiments show implementations of the apparatus 100 when the locking pin 118 is in the locked position, and the pistons and the connecting rod 110 reciprocate and the circular hub 112 is prevented from rotating.

Figure 2:
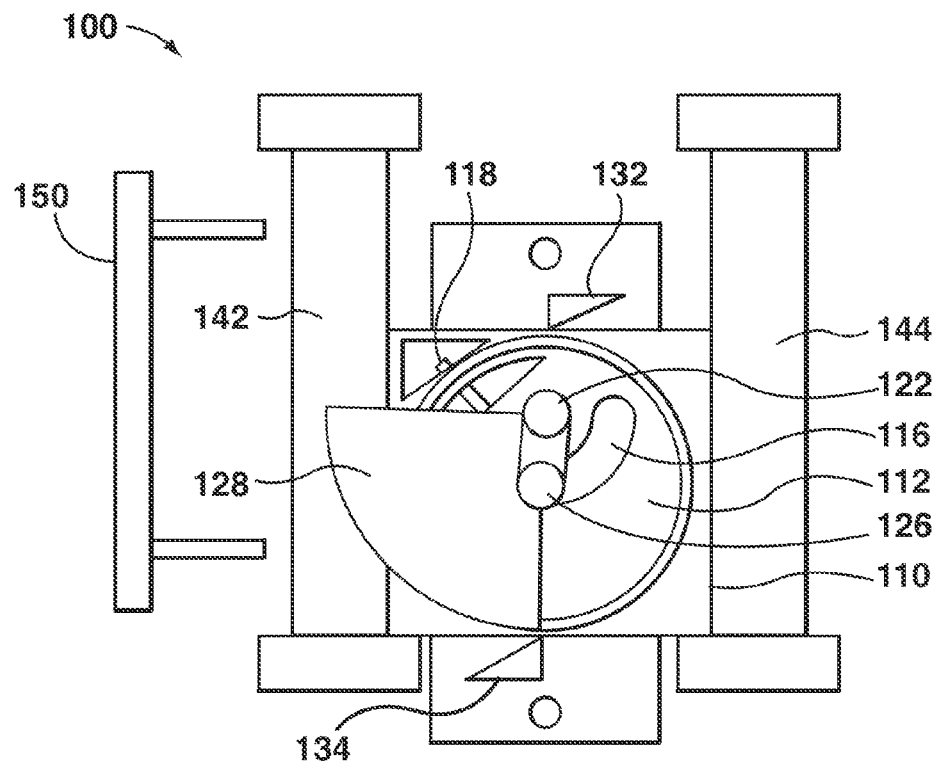
FIG. 2 shows a front view of the apparatus for rotating the crankshaft.

Referring first to FIG. 2, an example front view of the apparatus 100 for rotating the crankshaft 120 is illustrated. As illustrated, the apparatus 100 includes the connecting rod 110 that is in between the first piston and the second piston (not shown). The circular hub 112 is rotatably mounted within the connecting rod 110. More specifically, the circular hub 112 is included within the bearing 114 of the connecting rod 110. The circular hub 112 defines the channel 116 that defines an s-shape formed in between the first end of the channel 116 and the second end of the channel 116. The apparatus 100 as illustrated rotates the crankshaft 120. The crankshaft 120 includes the main shaft 122 and the crank pin 126 that is axially offset from the main shaft 122 with each end of the crank pin 126 being connected to the main shaft 122 by a respective crank arm. In order for the apparatus 100 to engage and rotate the crankshaft 120, the crank pin 126 is disposed within the channel 116 of the circular hub 112.

The crankshaft 120 further includes the arc-shaped extension 128 that includes at least a portion that extends beyond the crank arms. More specifically, the arc-shaped extension 128 includes a first side, a second side and an arc. The first side is in alignment with the crank arms, and at a ninety degree angle offset from the second side that defines the angle of the arc. The arc-shaped extension 128 may engage the first protrusion 132 (that is located between the first piston and the circular hub 112) and alternatively the second protrusion 134 (that is located between the second piston and the circular hub 112) during reciprocation of the pistons. As mentioned above, as the crank pin 126 is disposed within the channel 116, at certain positions of the crank pin 126 within the channel 116 (such as, at the first end and the second end of the channel 116), a piston is at top dead center and may apply a force (for example, caused by the combustion of gases above the piston which exerts a force on the piston) against the crank pin 126 to hinder the continued movement of the crank pin 126 within the channel 116. The engagement between the arc-shaped extension 128 and a protrusion (such as the first protrusion 132 or the second protrusion 134) imparts this opposing force from the piston against the crank pin 126 via the connecting rod 110 to the main shaft 122 to allow the continued free travel of the crank pin 126 within the channel 116.

The apparatus 100 further includes the locking pin 118 that is adjustable between a locked position and an unlocked position. When the locking pin 118 is in the locked position, the circular hub 112 is prevented from rotating within the bearing 114 of the connecting rod 110. The pistons and the connecting rod 110 may reciprocate (i.e. move upward and downward) to impart reciprocating travel of the crank pin 126 between the first end and the second end of the channel 116. The movement of the crank pin 126 within the channel 116, consequently rotates the main shaft 122 and the crankshaft 120. While when the locking pin 118 is in the unlocked position, the crankshaft 120 and the circular hub 112 may freely rotate. The pistons and the connecting rod 110 are in a stationary position.

The guiding mechanism to support linear movement of the connecting rod 110 is also included. More specifically, the guiding mechanism includes the first guide 142 and the second guide 144 with the connecting rod 110 located in between the first guide 142 and the second guide 144. In the illustrated example, the guides support the linear upward and downward movement of the connecting rod 110 during reciprocation of the pistons. The length of the guides defines a length of linear movement of the connecting rod 110 during reciprocation of the pistons. That is, the connecting rod 110 may only travel the length from one ends of the guides to the other ends of the guides.

The apparatus 100 further includes the locking mechanism in the form of the connecting rod lock 150 that includes the first projection and the second projection. Each of these projections may cooperate with an opening within the first guide 142. That is, when the connecting rod lock 150 is engaged, each of the projections passes through the openings such that a portion of each of the projections extend beyond the openings to engage the connecting rod 110, and maintain the connecting rod 110 in a stationary position.

In the illustrated example, the locking pin 118 is in the locked position. Accordingly, the circular hub 112 is locked and cannot rotate within the connecting rod 110, while the pistons may reciprocate causing the connecting rod 110 to reciprocate in an upward and downward movement. The connecting rod lock 150 is also disengaged. As shown, the first piston is at its BDC while the second piston as its TDC. At such a position, the connecting rod 110 is at one ends of the guides, and accordingly, is at the lowest position of downward travel along the guides. The crank pin 126 is disposed within the channel 116 at a midway point between the first end and the second end of the channel 116. The arc-shaped extension 128 is at the threshold of being disengaged from the second protrusion 134 (i.e. clearing the second protrusion 134) to allow the upward travel of the pistons and the connecting rod 110. Accordingly, a cycle of reciprocation of the pistons and a full rotation of the crankshaft by 360 degrees is being depicted; with the first piston at its BDC and the second piston at its TDC to reciprocate upwards and then downwards, and to consequently move the crank pin 126 between the ends of the channel 116 and rotate the main shaft 122 (and the crankshaft 120) in a clockwise direction.

Figure 3:
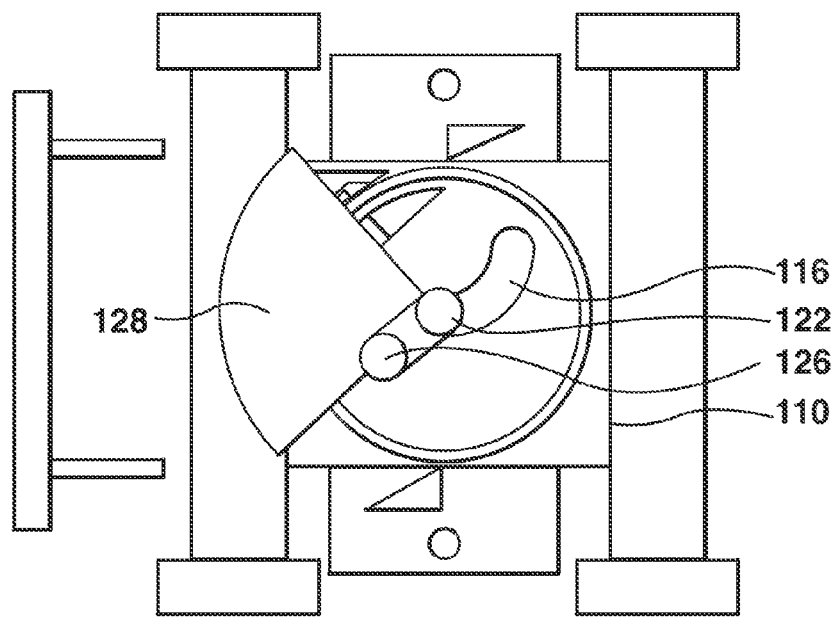
FIG. 3 shows another front view of the apparatus for rotating the crankshaft.

Referring to FIG. 3, which shows another front view of the apparatus 100 for rotating the crankshaft 120, the pistons and the connecting rod 110 reciprocate to travel upwards. As shown, the first piston and the second piston are both at midway between each of their TDC and BDC (from the BDC of the first piston and the TDC of the second piston as shown in FIG. 2). The upward motion of the pistons and the connecting rod 110 causes the crank pin 126 to travel within the channel 116 to closer to the first end of the channel 116 (from the midway point as shown in FIG. 2). The movement of the crank pin 126 causes the main shaft 122 and the arc-shaped extension 128 to rotate in a clockwise direction.

Figure 4:
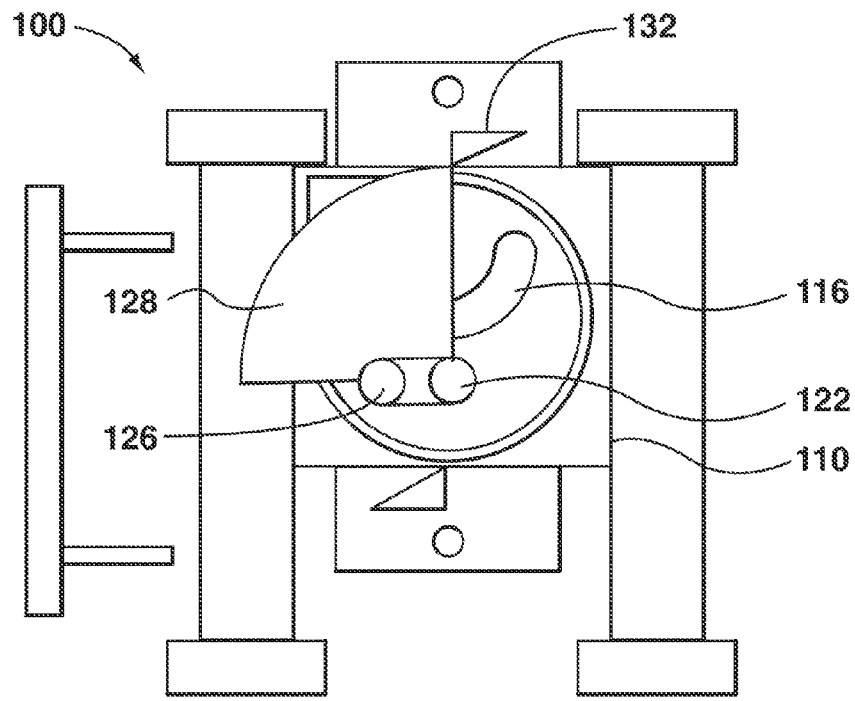
FIG. 4 shows a further front view of the apparatus for rotating the crankshaft.

With reference to FIG. 4, which shows a further front view of the apparatus 100 for rotating the crankshaft 120, the pistons and the connecting rod 110 continue travelling upwards until, as shown, the first piston is at its TDC and the second piston is at its BDC and the connecting rod 110 reaches the other ends of the guides. At such a position, the connecting rod 110 is at the highest position of upward travel along the guides. The crank pin 126 travels along the channel 116 to reach the first end of the channel 116. Consequently, the main shaft 122 and the arc-shaped extension 128 continue to rotate in the clockwise direction. The arc-shaped extension 128 rotates to reach the threshold of being engaged with the first protrusion 132.

Figure 5:
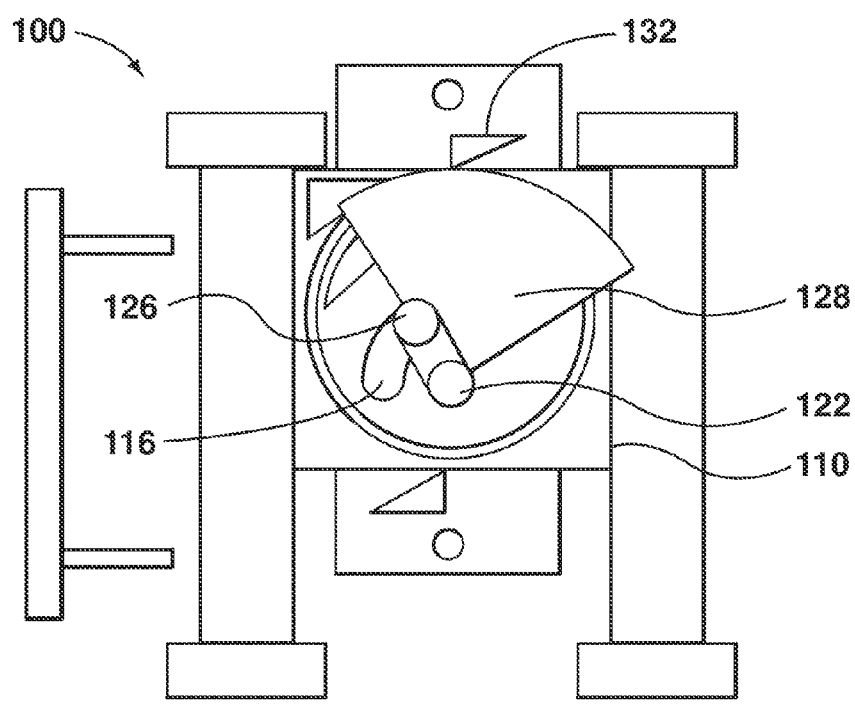
FIG. 5 shows a yet further front view of the apparatus of rotating the crankshaft.

With reference to FIG. 5, which shows a yet further front view of the apparatus 100 for rotating the crankshaft 120, the pistons and the connecting rod 110 remain stationary at the upward position with the first piston at its TDC and the second piston at its BDC and the connecting rod 110 continuing to remain at the other end of the guides. The arc-shaped extension 128 continues to rotate while the arc of the arc-shaped extension 128 engages the first protrusion 132. The engagement between the arc and the first protrusion 132 imparts the downward force exerted by the first piston against the crank pin 126 via the connecting rod 110 to the main shaft 122. Accordingly, the crank pin 126 is free to continue to travel in an opposite direction after reaching the first end of the channel 116 to reach a point within the channel 116 beyond the first end of the channel 116, as is shown.

Figure 6:
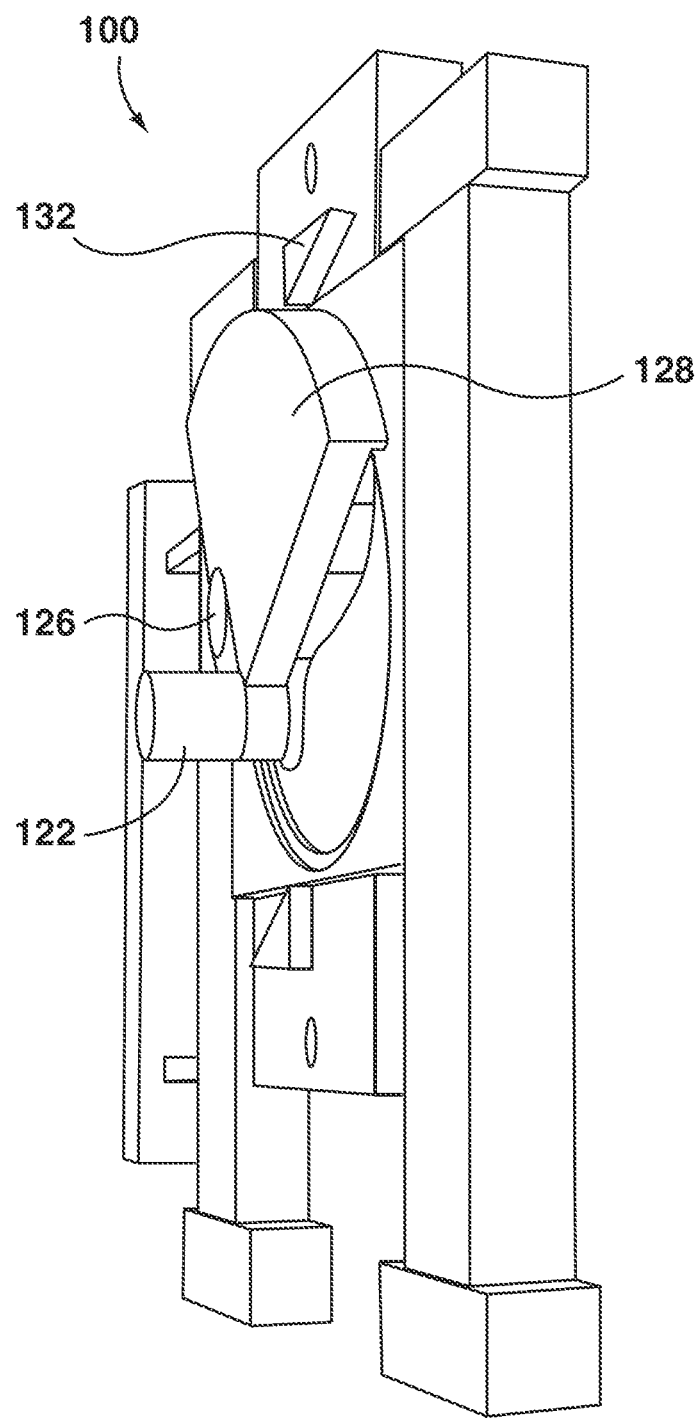
FIG. 6 shows a perspective view of the apparatus of FIG. 5.

The engagement between the arc of the arc-shaped extension 128 and the first protrusion 132 is further illustrated in FIG. 6, which shows a perspective view of the apparatus 100 of FIG. 5. More particularly, the arc-shaped extension 128 is elevated from the protrusions (i.e. it is at a higher level than the first protrusion 132 and the second protrusion 134). The arc includes a depressed portion that engages the first protrusion 132 as shown. Accordingly, the depressed portion of the arc allows the arc to engage with the first protrusion 132 to impart the downward force exerted by the first piston against the crank pin 126 via the connecting rod 110 to the main shaft 122, and allow the crank pin 126 to continue to travel from the first end of the channel 126.

Figure 7:
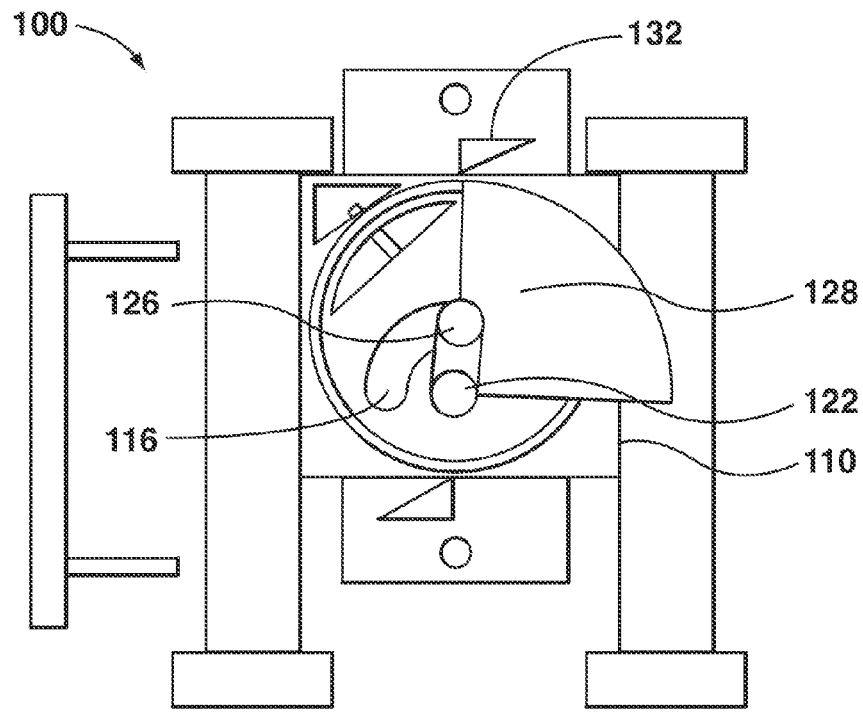
FIG. 7 shows another front view of the apparatus for rotating the crankshaft.

Referring to FIG. 7, which shows another front view of the apparatus 100 for rotating the crankshaft 120, the pistons and the connecting rod 110 continue to remain stationary due to the continued engagement between the arc-shaped extension 128 and the first protrusion 132. The crank pin 126 continues to travel to reach the midway point between the first end and the second end of the channel 116. The arc-shaped extension 128 continues to rotate to reach the threshold of being disengaged from the first protrusion 132 (i.e. clearing the first protrusion 132) to allow the downward travel of the pistons and the connecting rod 110.

Figure 8:
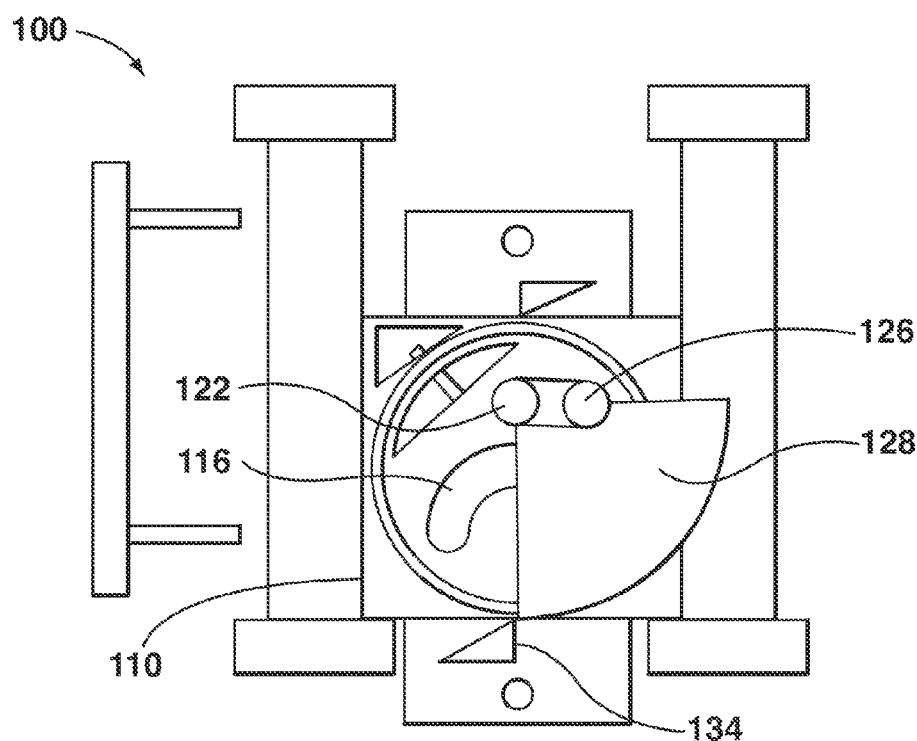
FIG. 8 shows a further front view of the apparatus for rotating the crankshaft.

Referring to FIG. 8, which shows a further front view of the apparatus 100 for rotating the crankshaft 120, the pistons and the connecting rod 110 are now free to travel downwards.

They continue to travel until the first piston is at its BDC from its TDC and the second piston is at its TDC from its BDC, and the connecting rod 110 is at the end of the guides to reach the lowest position of downward travel along the guides. The crank pin 126 continues to travel along the channel 116 to reach the second end of the channel 116. Consequently, the main shaft 122 and the arc-shaped extension 128 continue to rotate in the clockwise direction. The arc-shaped extension 128 rotates to reach the threshold of being engaged with the second protrusion 134.

Figure 9:
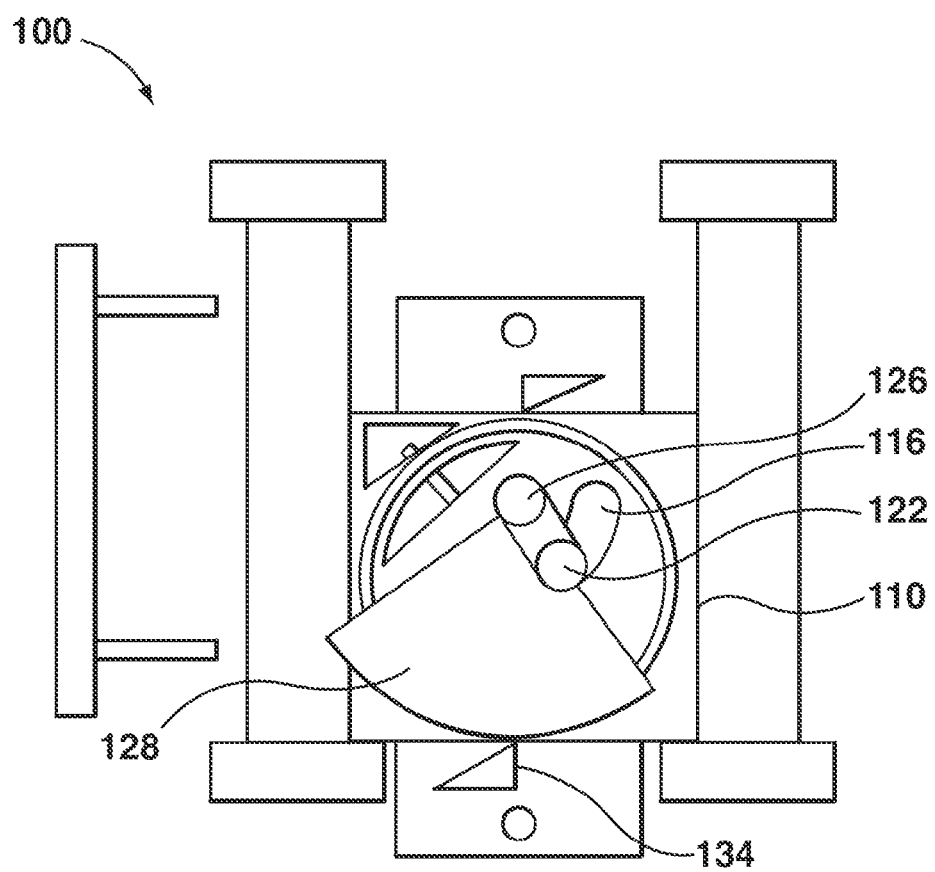
FIG. 9 shows a yet further front view of the apparatus for rotating the crankshaft.

With reference to FIG. 9, which shows a yet further front view of the apparatus 100 for rotating the crankshaft 120, the pistons and the connecting rod 110 remain stationary at the downward position with the first piston at its BDC and the second piston at its TDC and the connecting rod 110 continuing to remain at the ends of the guides. The arc-shaped extension 128 continues to rotate while the arc of the arc-shaped extension 128 engages the second protrusion 134. The engagement between the arc and the second protrusion 134 imparts the upward force exerted by the second piston against the crank pin 126 via the connecting rod 110 to the main shaft 122. Accordingly, the crank pin 126 is free to continue to travel in an opposite direction after reaching the second end of the channel 116 to reach a point within the channel 116 beyond the second end of the channel 116, as is shown.

The crank pin 126 may continue to travel to again reach the midway point between the first end and the second end of the channel 116, and the arc-shaped extension 128 may continue to rotate to again reach the threshold of being disengaged from the second protrusion 134 to allow the upward travel of the pistons and the connecting rod 110. Accordingly, the crank pin 126 and the arc-shaped extension 128 return to the position as shown in FIG. 2, and a cycle of reciprocation of the pistons and a full rotation of the crankshaft by 360 degrees has occurred.

Figure 10:
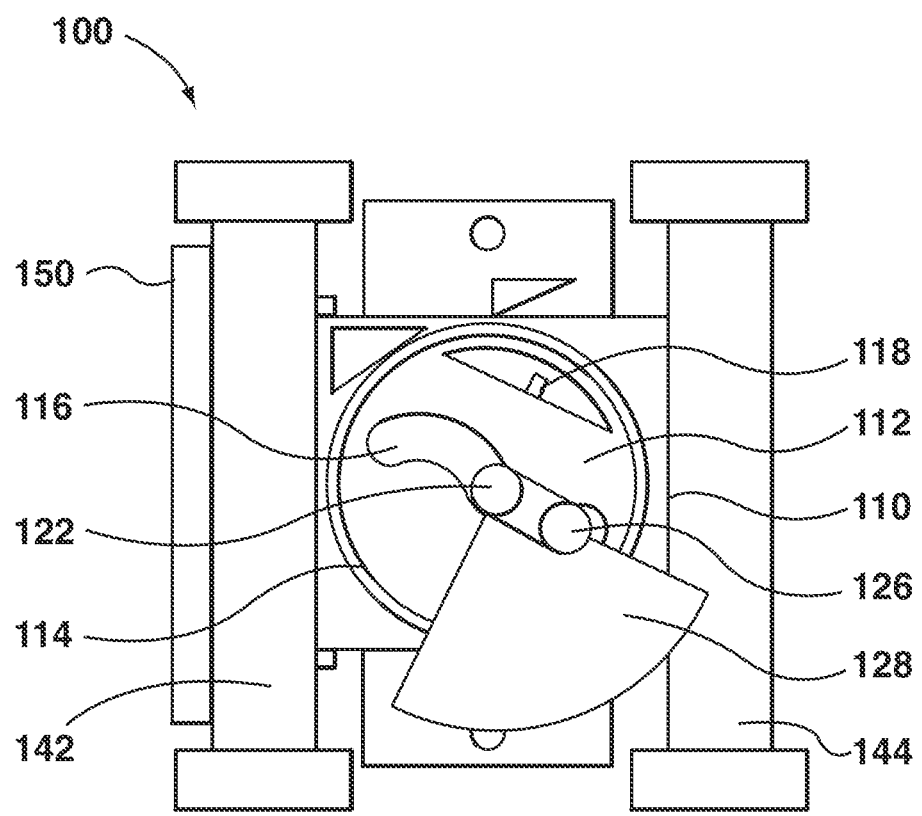
FIG. 10 shows a front view of the apparatus for rotating the crankshaft when a circular hub is freely rotating.
Figure 11:
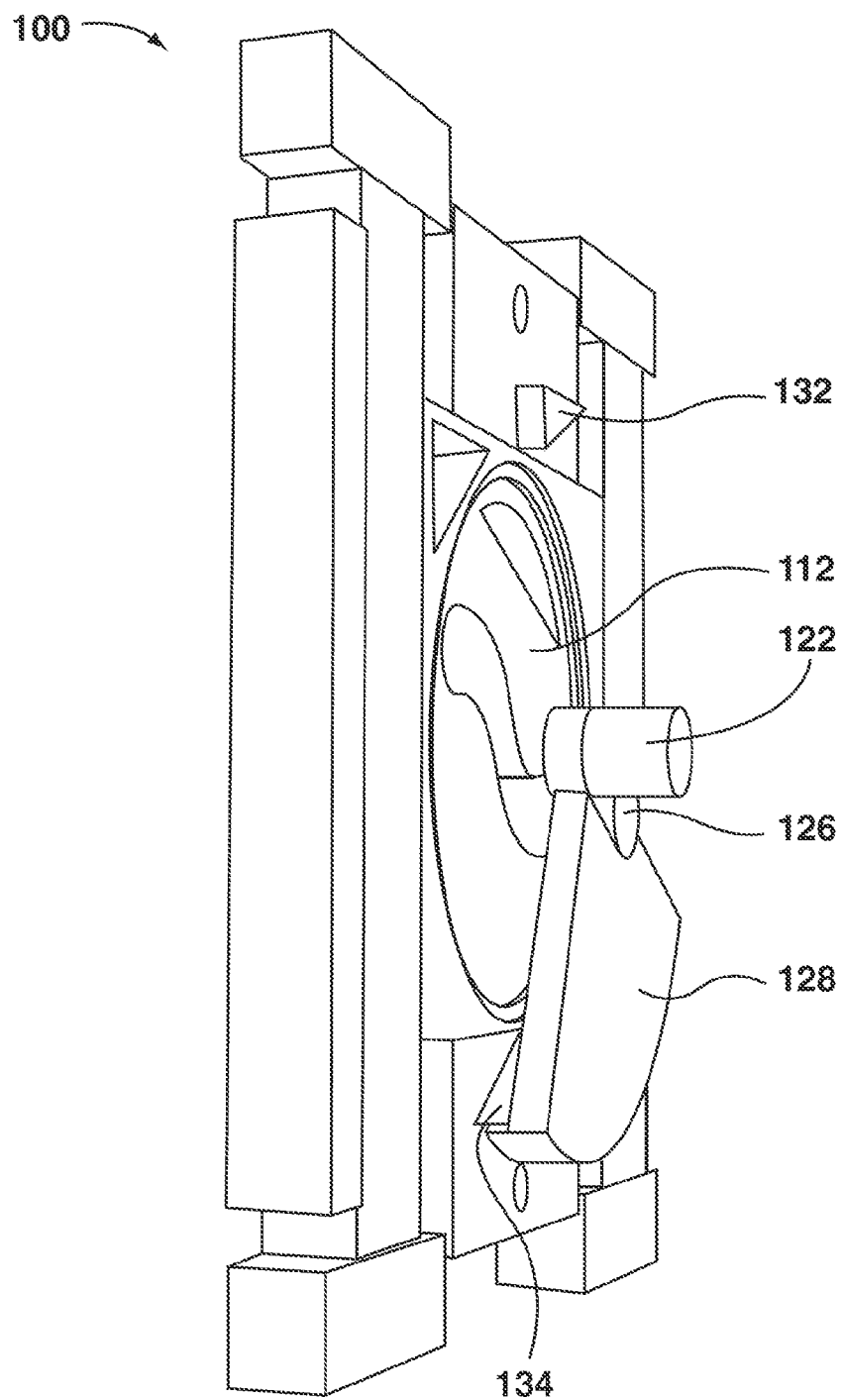
FIG. 11 shows a perspective view of the apparatus of FIG. 10.
Figure 12:
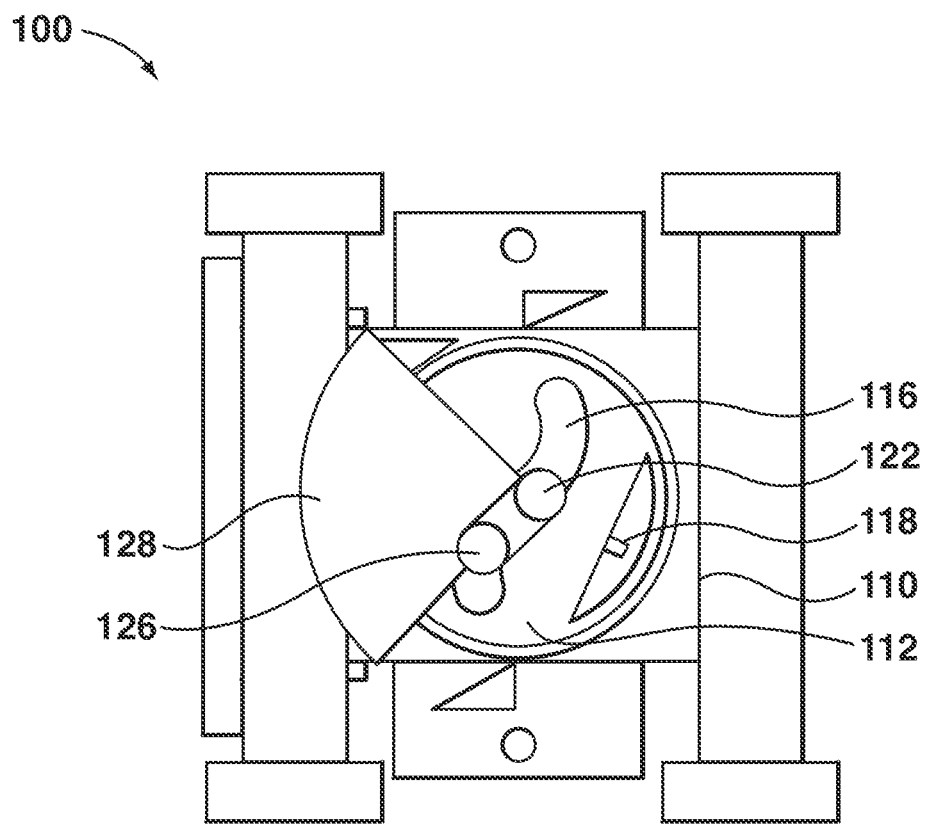
FIG. 12 shows another front view of the apparatus for rotating the crankshaft when the circular hub is freely rotating.

Reference will now be made to FIGS. 10 to 12 which show various example embodiments of the apparatus 100 for rotating the crankshaft 120. More particularly, the example embodiments show implementations of the apparatus 100 when the locking pin 118 is in the unlocked position, and the pistons and the connecting rod 110 are in a fixed position, and the crankshaft 120 and the circular hub 112 rotate freely.

Referring to FIG. 10, which shows a front view of the apparatus 100 for rotating the crankshaft 120, the locking pin 118 is in the unlocked position and the crankshaft 120 and the circular hub 112 rotate freely. The pistons and the connecting rod are stationary. The pistons may be maintained stationary when each of the pistons is positioned approximately midway between its TDC and BDC. At such a position, the main shaft 122 is aligned centered at the circular hub 112. That is, the main shaft 122 is positioned aligned at midway between the first end and the second end of the channel 116 which is the center of the circular hub 112 (as illustrated in FIG. 3).

The connecting rod lock 150 is engaged in that each of the projections passes through respective openings (i.e. passageways) in the first guide 142 such that a portion of each of the projections passes through the openings to engage the connecting rod 110. More particularly, the bearing 114 of the connecting rod 110 that includes the circular hub 112 is in between each of the portions of the projections extending beyond the openings. These portions engage the connecting rod 110 at the bearing 114 to maintain the connecting rod 110 at the stationary position.

In the illustrated example, the crank pin 126 freely rotates about the main shaft 122 with the channel 116. That is, the crank pin 126 rotates around the main shaft 122 with the channel 116 causing the circular hub 112 to rotate. As the pistons are stationary, the rotation of the crankshaft 120 (including the main shaft 122 and the crank pin 126) may occur by a variety of different means. For example, in at least some example embodiments, the operation of other apparatus that each includes a connecting frame with one or more pistons attached to the crankshaft 120 (which may or may not be of the same type as the apparatus 100 for rotating the crankshaft 120). That is, the reciprocating motion of the pistons and connecting frame of these apparatus impart rotational motion to the crankshaft 120, and more particularly the main shaft 122. The rotation of the main shaft 122 rotates the crank pin 126 around the main shaft 122 along with the channel 116, which causes the circular hub 112 to rotate. In at least some example embodiments, an electrical motor connected to the crank shaft 120 may instead be used to freely rotate the crank shaft 120, and accordingly the circular hub 112. It will be appreciated that other means may be used to rotate the crankshaft 120 and accordingly the circular hub 112.

As mentioned above, in order for the crankshaft 120 to rotate freely, the arc of the arc-shaped extension 128 of the crankshaft is disengaged from the protrusions. Such an illustration is depicted with reference to FIG. 11, which shows a perspective view of the apparatus 100 of FIG. 10. As the arc-shaped extension 128 is elevated from the protrusions, and the arc of the arc-shaped extension 128 including the depressed portion extends beyond the protrusions at such a position of the main shaft (i.e. the main shaft is aligned centered at the circular hub), the arc clears the protrusions (i.e. as shown clearing the first protrusion 132) during rotation of the arc-shaped extension 128. Accordingly, the crankshaft 120 and the circular hub 112 may rotate freely as the arc-shaped extension 128 does not engage the protrusions.

Referring to FIG. 12, which shows another front view of the apparatus 100 for rotating the crankshaft 120, as the locking pin 118 is in the unlocked position, the crankshaft 120 and the circular hub 112 continue to freely rotate. As shown, the crank pin 126 rotates about the main shaft 122 with the channel 116 of the circular hub 112 that is being rotated.

The example embodiments of the apparatus 100 for rotating the crankshaft have been described as having a first piston and a second piston. However, as mentioned above, in at least some example embodiments, the apparatus 100 may only include one piston, such as the first piston (and not the second piston). In such example embodiments, the reciprocation of the first piston (and consequently the connecting rod 110) may cause the crank pin 126 to reciprocate between the ends of the channel 116, and consequently rotate the main shaft 122 when the locking pin 118 is in the locked position, as described above.

Although, the apparatus 100 for rotating the crankshaft 120 has been described to be implemented in an internal combustion engine, it will be appreciated that the apparatus 100 may be implemented in other systems. More particularly, the apparatus 100 may be implemented in any system that requires the conversion of linear motion to rotational motion.

Additionally, certain adaptations and modifications of the described embodiments can be made. Therefore, the above discussed embodiments are considered to be illustrative and not restrictive.

What is claimed is:

1. An apparatus for rotating a crankshaft, the crankshaft including a main shaft and an axially offset crank pin, each end of the crank pin being connected to the main shaft by a respective crank arm, the apparatus comprising:
   a first piston;

a connecting frame attached to the first piston, wherein the first piston is configured to drive the connecting frame in reciprocating motion;

a hub rotatably mounted within the connecting frame, the hub having defined therein a channel, the crank pin being disposed within the channel; and a locking mechanism having a locked state in which the hub is prevented by the locking mechanism from rotating within the connecting frame and an unlocked state in which the hub freely rotates within the connecting frame, wherein the reciprocating motion of the first piston and the connecting frame impart reciprocating travel of the crank pin between a first end of the channel to a second end of the channel and consequent rotation of the main shaft when the locking mechanism is in the locked state, wherein the crankshaft and the hub rotate freely when the locking mechanism is in the unlocked state, and wherein the first piston and the connecting frame are in a stationary position when the locking mechanism is in the unlocked state.

2. The apparatus of claim 1, further comprising a second piston attached to the connecting frame and opposing the first piston, wherein the first piston and the second piston are configured to alternatively drive the connecting frame in reciprocating motion, and wherein the second piston is in a stationary position when the locking mechanism is in the unlocked state.

3. The apparatus of claim 2, wherein the first piston and the second piston are each positioned approximately midway between their top dead center and bottom dead center from the main shaft, and the main shaft is aligned centered at the hub and the crank pin rotates about the main shaft with the channel when the locking mechanism is in the unlocked state.

4. The apparatus of claim 1, wherein the crankshaft includes an arc-shaped extension that includes at least a portion that extends beyond the crank arm, the arc-shaped extension includes a first side, a second side and an arc, the first side extends in alignment with the crank arms and at an angle offset from the second side that defines the angle of the arc, and the connecting frame includes a first protrusion located between the first piston and the hub, the arc engages the first protrusion to impart a first opposing force from the first piston against the crank pin via the connecting frame to the main shaft to allow the travel of the crankpin within the channel when the locking mechanism is in the locked state and the first piston is positioned at its top dead center from the main shaft and the second piston is positioned at its bottom dead center from the main shaft.

5. The apparatus of claim 4, wherein the connecting frame further includes a second protrusion located between the second piston and the hub, the arc engages the second protrusion to impart a second opposing force from the reciprocating second piston against the crank pin via the connecting frame to the main shaft to allow the travel of the crankpin within the channel when the locking mechanism is in the locked state and the second piston is positioned at its top dead center from the main shaft and the first piston is positioned at its bottom dead center from the main shaft.

6. The apparatus of claim 4, wherein the arc-shaped extension is elevated from the first protrusion, and the arc-shaped extension is disengaged from the first protrusion to allow the crankshaft to rotate freely when the locking mechanism is in the unlocked state.

7. The apparatus of claim 4, wherein the first side and the second side of the arc-shaped extension are offset at the angle of ninety degrees.

8. The apparatus of claim 1, wherein the channel defines an s-shape formed between the first end and the second end of the channel.

9. The apparatus of claim 1, further comprising a connecting frame lock that engages the connecting frame to maintain the connecting frame at a stationary position when the locking mechanism is in the unlocked state.

10. An internal combustion engine comprising:

a combustion chamber;

a crankshaft, the crankshaft including a main shaft and an axially offset crankpin, each end of the crank pin being connected to the main shaft by a respective crank arm; and an apparatus for rotating the crankshaft comprising:

a first piston;

a connecting frame attached to the first piston, wherein the first piston is configured to alternately drive the connecting frame in reciprocating motion;

a hub rotatably mounted within the connecting frame, the hub having defined therein a channel, the crank pin being disposed within the channel; and a locking mechanism having a locked state in which the hub is prevented by the locking mechanism from rotating within the connecting frame and an unlocked state in which the hub freely rotates within the connecting frame, wherein the reciprocating motion of the first piston and the connecting frame imparts reciprocating travel of the crank pin between a first end of the channel to a second end of the channel and consequent rotation of the main shaft when the locking mechanism is in the locked state, wherein the crankshaft and the hub rotate freely when the locking mechanism is in the unlocked state, and wherein the first piston and the connecting frame are in a stationary position when the locking mechanism is in the unlocked state.

* * * * *